(12) United States Patent
Nakayama

(10) Patent No.: US 12,552,031 B2
(45) Date of Patent: Feb. 17, 2026

(54) WORK MANAGEMENT SYSTEM

(71) Applicant: FUJI CORPORATION, Chiryu (JP)

(72) Inventor: Yukinori Nakayama, Hekinan (JP)

(73) Assignee: FUJI CORPORATION, Chiryu (JP)

(*) Notice: Subject to any disclaimer, the term of this patent is extended or adjusted under 35 U.S.C. 154(b) by 377 days.

(21) Appl. No.: 17/619,037

(22) PCT Filed: Jul. 5, 2019

(86) PCT No.: PCT/JP2019/026824
§ 371 (c)(1),
(2) Date: Dec. 14, 2021

(87) PCT Pub. No.: WO2021/005644
PCT Pub. Date: Jan. 14, 2021

(65) Prior Publication Data
US 2022/0347848 A1 Nov. 3, 2022

(51) Int. Cl.
*B25J 9/16* (2006.01)
(52) U.S. Cl.
CPC ... *B25J 9/1674* (2013.01); *G05B 2219/39001* (2013.01); *G05B 2219/40202* (2013.01)
(58) Field of Classification Search
CPC ......... B25J 9/1674; G05B 2219/39001; G05B 19/4183; G05B 2219/45026; H05K 13/086
See application file for complete search history.

(56) References Cited

U.S. PATENT DOCUMENTS

| | | | | |
|---|---|---|---|---|
| 5,319,846 A | * | 6/1994 | Takahashi | H05K 13/086 414/416.08 |
| 9,597,801 B2 | * | 3/2017 | Morrill | B25J 5/02 |
| 10,188,013 B1 | * | 1/2019 | Gold | B25J 9/026 |
| 11,864,324 B2 | * | 1/2024 | Yasui | H05K 13/085 |
| 2016/0107312 A1 | * | 4/2016 | Morrill | G11B 17/22 700/214 |
| 2018/0027686 A1 | * | 1/2018 | Adiletta | G11C 5/02 |

(Continued)

FOREIGN PATENT DOCUMENTS

| | | | |
|---|---|---|---|
| CN | 108858184 A | 11/2018 | |
| EP | 2286963 A1 * | 2/2011 | ............. B23P 21/00 |
| JP | WO2014/010083 A1 | 1/2014 | |

OTHER PUBLICATIONS

International Search Report mailed on Sep. 17, 2019 in PCT/JP2019/026824 filed on Jul. 5, 2019 (1 page).

*Primary Examiner* — Wade Miles
*Assistant Examiner* — Mohammed Yousef Abuelhawa
(74) *Attorney, Agent, or Firm* — Oblon, McClelland, Maier & Neustadt, L.L.P.

(57) ABSTRACT

A work management system is applied to a work area in which a predetermined work is executed by a worker and a robot. The work management system includes a control section configured to control the robot such that a specified operation set in advance is included in an operation by the robot executing the predetermined work, an information acquisition section configured to acquire work information indicating a presence or absence of the specified operation in at least one of an execution result and an execution process of the predetermined work, and an identification section configured to identify whether a work subject of the predetermined work is the worker or the robot based on the work information acquired by the information acquisition section.

12 Claims, 6 Drawing Sheets

(56) References Cited

U.S. PATENT DOCUMENTS

2018/0346256 A1* 12/2018 Kurihara ................ B25J 9/1674
2019/0070730 A1* 3/2019 Morioka ................ B25J 9/1666
2020/0376664 A1* 12/2020 Kanno ................... B25J 9/1679

* cited by examiner

WORK MANAGEMENT SYSTEM

TECHNICAL FIELD

The present disclosure relates to a work management system.

BACKGROUND ART

A work management system is applied to a work area where, for example, a worker and a robot perform a predetermined work. Patent Literature 1 discloses a configuration in which a worker and a robot can execute a feeder exchange operation on a component mounter in a work area where a board product is produced. Here, when a predetermined work is executed in the work area as described above, there is a management demand for identifying whether a work subject is a worker or a robot. The above identification is assumed to be based on the presence or absence of communication between the robot and the work management system before the execution of the predetermined work.

Patent Literature

Patent Literature 1: International Publication No. WO2014/010083

BRIEF SUMMARY

Technical Problem

However, if the worker executes the predetermined work after the robot communicates with the work management system, there is a problem in that the work subject may be erroneously recognized as the robot. In addition, in the configuration in which the communication is used for identifying the work subject, a configuration that enables the communication is required and there is a concern that the process load and required time for the communication will increase.

An object of the present specification is to provide a work management system capable of more accurately identifying the work subject of the predetermined work executed in the work area.

Solution to Problem

The present specification discloses a first work management system that is applied to a work area in which a predetermined work is executed by a worker and a robot, the system includes a control section configured to control the robot such that a specified operation set in advance is included in an operation by the robot executing the predetermined work, an information acquisition section configured to acquire work information indicating a presence or absence of the specified operation in at least one of an execution result and an execution process of the predetermined work when the predetermined work is executed in the work area, and an identification section configured to identify whether a work subject of the predetermined work is the worker or the robot based on the work information acquired by the information acquisition section.

The present specification discloses a second work management system that is applied to a work area in which a predetermined work is executed by a worker and a robot, the system includes a control section configured to control the robot executing the predetermined work, a detection device configured to detect the worker in the work area, and an identification section configured to identify whether a work subject of the predetermined work is the worker or the robot based on a detection result by the detection device when the predetermined work is executed in the work area.

Advantageous Effects

According to the configuration of such first and second work management systems, when the predetermined work is executed in the work area, the work subject of the predetermined work can be identified. As a result, since the work subject can be identified regardless of the presence or absence of the communication between the robot and the work management system, it is possible to suppress the increase in the process load and the required time, and thus, it is possible to improve the work manageability.

DESCRIPTION OF EMBODIMENTS

1. Overview of Work Management System

Hereinafter, an embodiment that embodies a work management system will be described with reference to the drawings. The work management system is applied to a work area where both a worker and a robot perform the predetermined work. The robot described above configures an exchange system for exchanging an exchange element with a board work machine that executes the board work, for example, in a production line where a predetermined board product is produced.

2. Configuration of Production Line 1

Figure 1:
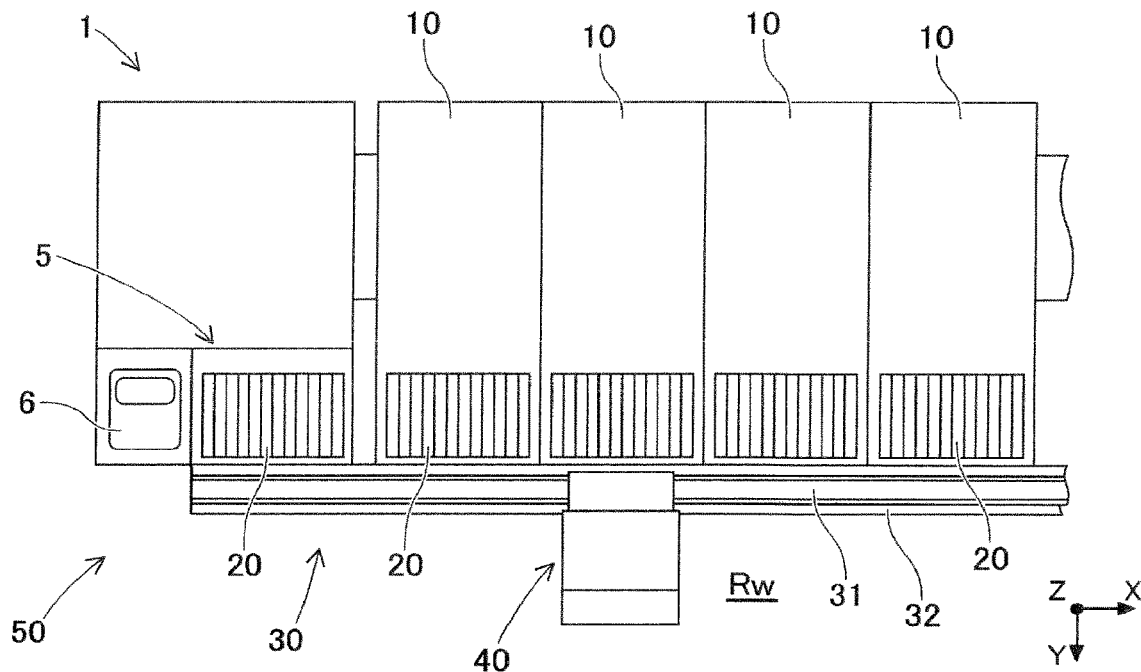
FIG. 1 is a plan view showing a work area to which a work management device in an embodiment is applied.
Figure 2:
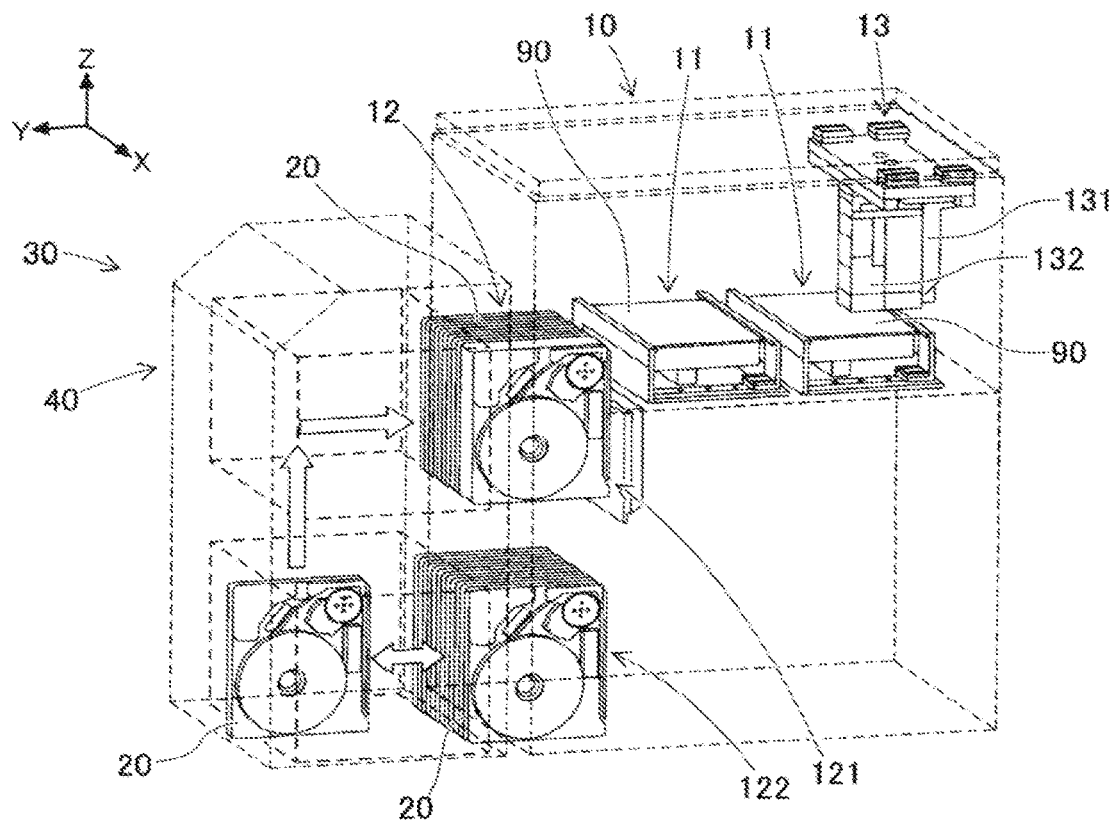
FIG. 2 is a perspective view showing an outline of a configuration of an exchange system and a component mounter in FIG. 1.

As shown in FIG. 1, production line 1 is configured to have multiple component mounters 10 installed side by side in the conveyance direction of board 90 (refer to FIG. 2). Feeder storage device 5 used for storing cassette type feeder 20 is installed on a board conveying side of production line 1 (on the left side in FIG. 1). In addition, the configuration of production line 1 can be appropriately added or changed according to, for example, the type of board product to be produced. Specifically, a board work machine such as a solder printer, an inspection machine, and a reflow furnace can be appropriately installed in production line 1.

In the present embodiment, exchange robot 40 is applied to production line 1 as a work device that performs a predetermined work on each of multiple component mounter 10 and feeder storage device 5. Each device and exchange robot 40 configuring production line 1 are configured to be able to input and output various data to and from host computer 6 via a network. The detailed configuration of exchange system 30 including exchange robot 40 will be described later.

Feeder storage device 5 includes multiple slots. Feeder storage device 5 stocks feeder 20 equipped in each of the multiple slots. Feeder 20 equipped in the slot of feeder storage device 5 is in a state of being able to communicate with host computer 6. As a result, the slot of feeder storage device 5 and the identification code (ID) of feeder 20 equipped in the slot are recorded in host computer 6 in association with each other.

Host computer 6 monitors the operation status of production line 1 and integrally controls the board work machines such as component mounter 10 and feeder storage device 5 and exchange robot 40. Various data for controlling component mounter 10 and exchange robot 40 are stored in host computer 6. Host computer 6 transmits various data such as a control program when executing the component mounting process by component mounter 10, for example.

3. Configuration of Component Mounter 10

As shown in FIG. 2, multiple component mounters 10 configuring production line 1 include board conveyance device 11, component supply device 12, and head driving device 13. In the description below, it is assumed that the horizontal width direction of component mounter 10 which is the conveyance direction of board 90 is the X-direction, the horizontal depth direction of component mounter 10 is the Y-direction, and the vertical direction perpendicular to the X-direction and the Y-direction (the up-down direction in FIG. 2) is the Z-direction.

Board conveyance device 11 is configured with a belt conveyor, a positioning device, and the like. Board conveyance device 11 sequentially conveying board 90 to the conveyance direction and positions board 90 at a predetermined position in the machine. Board conveyance device 11 conveys board 90 out of component mounter 10 after the mounting process by component mounter 10 is completed.

Component supply device 12 supplies components to be mounted on board 90. Component supply device 12 includes upper slot 121 and lower slot 122 in which feeder 20 can be equipped. Upper slot 121 is disposed in the upper portion on the front portion side of component mounter 10, and holds equipped feeder 20 in an operational manner. The operation of feeder 20 equipped in upper slot 121 is controlled in the mounting process by component mounter 10, and the components are supplied at the take-out section provided at a defined position of the upper portion of feeder 20.

Lower slot 122 is disposed below upper slot 121 and stocks equipped feeder 20. That is, lower slot 122 preliminarily holds feeder 20 to be used for the production, or temporarily holds used feeder 20 used for the production. The exchange of feeder 20 between upper slot 121 and lower slot 122 is performed by automatic exchange by exchange robot 40 described later or manual exchange by the worker.

In addition, when feeder 20 is equipped in upper slot 121 or lower slot 122 of component supply device 12, electric power is supplied from component mounter 10 via a connector. Then, feeder 20 is in a state of being able to communicate with component mounter 10. Feeder 20 equipped in upper slot 121 controls a feeding operation of a carrier tape accommodating the components based on a control command by component mounter 10. As a result, feeder 20 supplies the components in the take-out section provided on the upper portion of feeder 20 so that the components can be picked up by holding member of mounting head 132 described later.

Head driving device 13 moves moving table 131 in the horizontal direction (X-direction and Y-direction) by a linear motion mechanism (not shown). Mounting head 132 is exchangeably fixed to moving table 131 by a clamp member (not shown). Mounting head 132 is integrally moved with the moving table 131 in the XY-direction by linear motion mechanism of head driving device 13. Mounting head 132 picks up the components supplied by component supply device 12 by the holding member. For example, as the holding member described above, a suction nozzle that picks up the component using supplied negative pressure air, a chuck that grips the component, or the like can be applied.

Mounting head 132 holds the holding member so as to be movable in the Z-direction and to be rotatable around the θ-axis parallel to the Z-axis. Mounting head 132 adjusts the position and angle of the holding member according to the posture of the picked up component. Then, mounting head 132 mounts the component at the mounting position on board 90 commanded by the control program.

The holding member held in mounting head 132 can be appropriately changed according to the type of the component in the mounting process for mounting the components on board 90. For example, when the suction nozzle used in the executed mounting process is not attached to mounting head 132, component mounter 10 causes mounting head 132 to hold the suction nozzle accommodated in the nozzle station (not shown). The nozzle station is detachably equipped at a predetermined position in component mounter 10.

4. Configuration of Feeder 20

Figure 3:
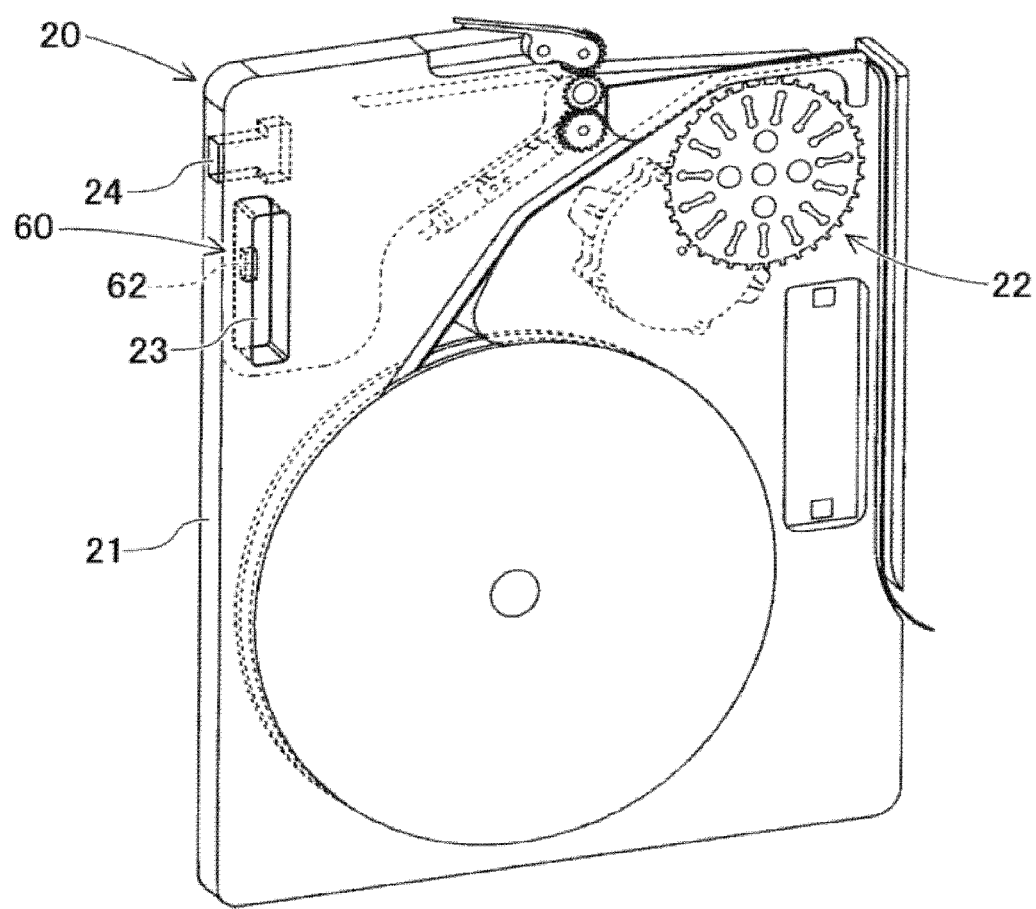
FIG. 3 is a perspective view showing an appearance of the feeder in FIG. 2.
Figure 4:
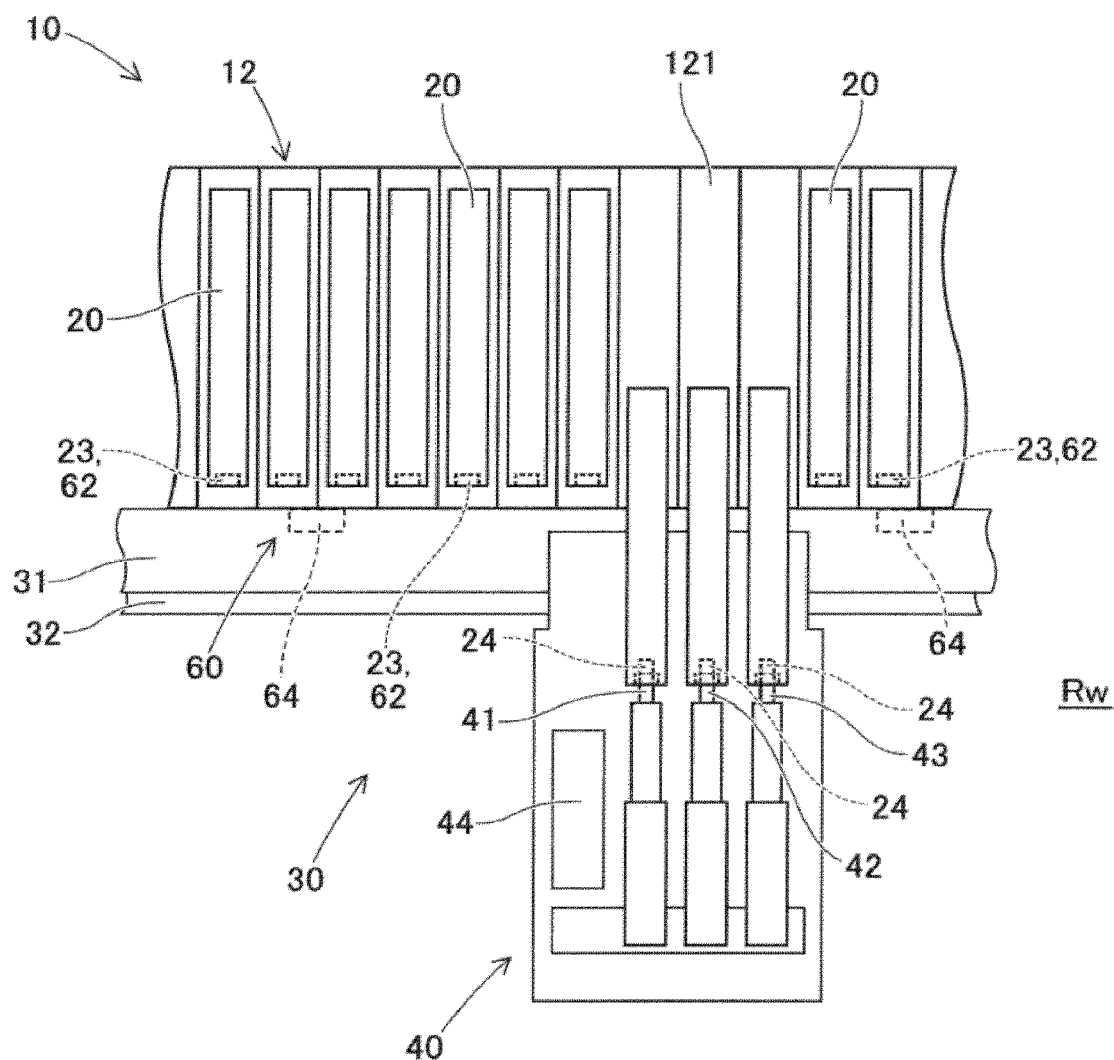
FIG. 4 is a plan view showing a feeder exchange operation between an exchange robot and a component supply device of the component mounter.

A configuration of feeder 20 will be described with reference to FIG. 3. Feeder 20 includes feeder main body 21, driving device 22, first held section 23, and second held section 24. As shown in FIG. 3, feeder main body 21 is formed in a flat box shape. Feeder main body 21 detachably (exchangeably) holds a tape reel around which a carrier tape accommodating multiple components is wound. Driving device 22 has a sprocket engaged with a feeding hole provided in the carrier tape. Driving device 22 rotates the sprocket to feed and move the carrier tape.

Feeder 20 controls the operation of driving device 22 by a control device (not shown). When feeder 20 is equipped in upper slot 121 of component mounter 10, electric power is supplied from component mounter 10 via the connector. As a result, the control device of feeder 20 is in a state of being able to communicate with component mounter 10. With such a configuration, component mounter 10 can detect the replenishment and recovery to and from feeder 20 for any of upper slot 121 or lower slot 122.

First held section 23 is a portion provided in feeder main body 21 and is held when the worker executes the exchange operation as a predetermined work. In the present embodiment, first held section 23 is formed by a part of an outer edge of an elongated hole penetrating feeder main body 21. First held section 23 is configured such that the worker can grip feeder 20 with one hand.

Second held section 24 is a portion provided in feeder main body 21 and is held when exchange robot 40 executes the exchange operation as a predetermined work. Second held section 24 is formed at a position and shape different from that of first held section 23. Second held section 24 is opened at a rear end surface on an upper side of feeder main body 21, and a distal end portion of holding arms 41 to 43 of exchange robot 40 (described later) is inserted and engaged with second held section 24. Second held section 24 is configured such that one of holding arms 41 to 43 can hold feeder 20.

5. Configuration of Exchange System 30 and Exchange Robot 40

As shown in FIG. 1 and FIG. 2, exchange system 30 includes first rail 31, second rail 32, and exchange robot 40. First rail 31 and second rail 32 configures a travel path of exchange robot 40. First rail 31 is provided between upper slot 121 and lower slot 122 in each of multiple component mounters 10 in the up-down direction. Second rail 32 is provided below lower slot 122 of component mounter 10. First rail 31 and second rail 32 extend over substantially the entire area in the conveyance direction of board 90 in production line 1.

Exchange robot 40 is provided so that it can travel along the travel path formed by first rail 31 and second rail 32. Exchange robot 40 is supplied with electric power from a power transmission section by non-contact power supply, for example, via a power receiving section provided facing the power transmission section provided on first rail 31. The electric power received by the power receiving section is used for travel and the predetermined work of exchange robot 40 via a power receiving circuit. Exchange robot 40 detects a current position on the travel path by a position detection device (not shown). An optical detection method or a detection method using electromagnetic induction can be applied to the above-described position detection device.

Exchange robot 40 performs a predetermined work in work area Rw. The above-described "predetermined work" includes an operation of exchanging an exchange element that is detachably equipped to a board work machine such as component mounter 10 with a board work machine. In the present embodiment, exchange robot 40 performs an exchange process of feeder 20 between multiple component mounters 10 configuring production line 1 and between feeder storage device 5 with feeder 20 that supplies the component mounted on board 90 as the exchange element. The exchange process described above includes at least one of the recovery work and the replenishment work of feeder 20.

In the present embodiment, exchange robot 40 conveys feeder 20 from feeder storage device 5 to upper slot 121 or lower slot 122 of component mounter 10. In addition, exchange robot 40 replaces feeder 20 between upper slot 121 and lower slot 122 of component mounter 10. Furthermore, exchange robot 40 conveys used feeder 20 from component mounter 10 to feeder storage device 5. Exchange robot 40 includes multiple holding arms 41 to 43 and control section 44.

Each of multiple holding arms 41 to 43 is configured such that the distal end portion is engaged with second held section 24 of feeder 20 so as to hold feeder 20. Each of multiple holding arms 41 to 43 is provided so as to be independently movable in the attachment and detachment direction (Y-direction in the present embodiment) of feeder 20. In addition, multiple holding arms 41 to 43 are provided so as to be integrally movable in the up-down direction (Z-direction). In the present embodiment, exchange robot 40 includes three holding arms 41 to 43, but may adopt a configuration in which four or more holding arms that are independently movable in the attachment and detachment direction of feeder 20.

Control section 44 is a controller mainly configured with a CPU, various memories, and control circuits. Control section 44 is communicably connected to multiple component mounters 10, feeder storage device 5, and host computer 6. Control section 44 controls the travel of exchange robot 40 and the operation of multiple holding arms 41 to 43. With the configuration described above, exchange robot 40 moves to a predetermined position along first rail 31 and second rail 32, and exchanges feeder 20, which is an exchange element, at a stop position.

6. Configuration of Work Management System 50

Figure 5:
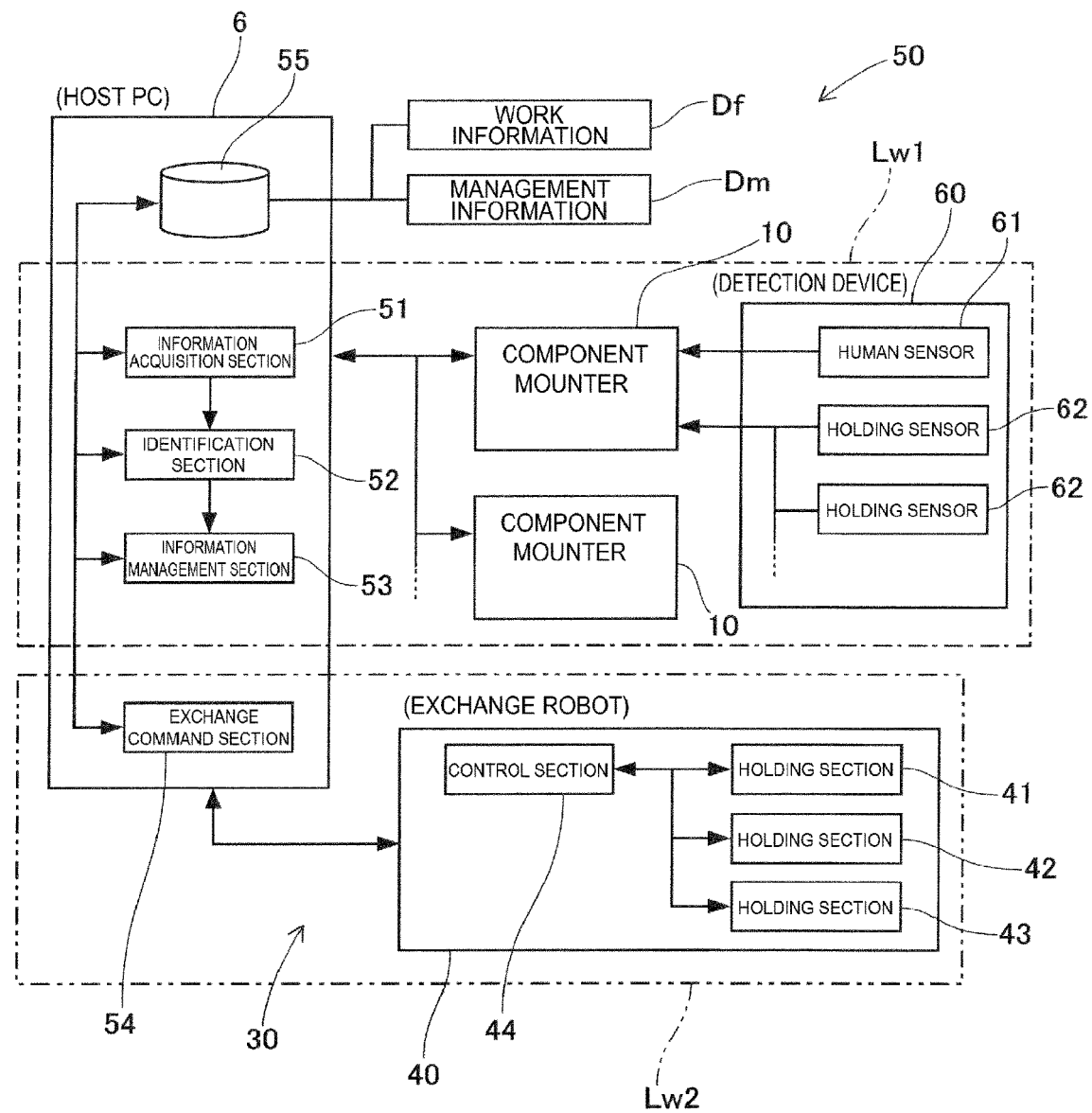
FIG. 5 is a block diagram showing a work management system.

In the present embodiment, a part of work management system 50 is configured with software installed on host computer 6, as shown in FIG. 5. In work area Rw to which work management system 50 is applied, the manual exchange of feeder 20 by the worker and the automatic exchange of feeder 20 by exchange robot 40 can be executed as examples of the predetermined work. Work management system 50 can recognize that the exchange operation (replenishment work or recovery work) of feeder 20 has been executed, based on the availability of communication with feeder 20.

Here, when the exchange operation of feeder 20 is executed in work area Rw as described above, there is a management demand for identifying whether the work subject is a worker or exchange robot 40. For example, if exchange robot 40 attempts to execute the exchange operation, work management system 50 recognizes the current state of whether the work has been appropriately executed, and determines whether exchange robot 40 can travel according to the recognized current state. In addition, work management system 50 determines whether to maintain or discard the identification information of the reel associated with each feeder 20, according to the work subject.

As shown in FIG. 5, host computer 6 can communicate with a board work machine such as component mounter 10 in first control system Lw1 including production line 1, and can communicate with exchange robot 40 in second control system Lw2 including exchange system 30. Therefore, work management system 50 can also determine whether the work subject of the exchange operation is exchange robot 40 by performing a predetermined signal communication with exchange robot 40 before or after the execution of the exchange operation. However, if the worker and exchange robot 40 attempt to execute the exchange operation at the same time, when the predetermined signal is received even though the worker actually executes the exchange operation, work management system 50 may erroneously recognize that exchange robot 40 is the work subject.

In addition, in work area Rw in which multiple control systems are constructed as described above, an amount of communication is required to be reduced from a viewpoint of improving work efficiency and reducing the process load. Specifically, for example, host computer 6 may command exchange robot 40 to collectively execute the exchange operation for multiple feeders 20, and minimize the communication with exchange robot 40 during the execution of the exchange operation multiple times. In such a configuration, when the communication is used to identify the work subject, there is a concern that the process load and the required time will increase due to the communication.

Therefore, work management system 50 in the present embodiment adopts a configuration in which the work subject of the predetermined work (for example, the exchange operation of feeder 20) executed in work area Rw can be identified more accurately. Specifically, as shown in FIG. 5, work management system 50 mainly includes control section 44 of exchange robot 40, information acquisition section 51, and identification section 52. Control section 44 of exchange robot 40 controls exchange robot 40 such that a specified operation set in advance is included in the operation of exchange robot 40 that executes the predetermined work.

Here, when both the worker and exchange robot 40 execute the predetermined work such that the specified operation is included, the "specified operation" described above is an operation in which a difference equal to or more than a certain amount occurs in the probability that the specified operation is actually included in the operation of each work subject. In addition, various aspects can be adopted for the specified operation. The details of the specified operation aspect will be described later.

When the predetermined work is executed in work area Rw, information acquisition section 51 acquires work information Df indicating the presence or absence of the specified operation in at least one of an execution result and an execution process of the predetermined work. The "execution result" described above includes a start time and an end time of the predetermined work, a required time, and an interval of the consecutive predetermined works. In addition, when the predetermined work is the exchange operation of feeder 20, the "execution result" includes specific information on feeder 20 and slot to be exchanged.

In addition, the "execution process" described above includes, for example, a position, an operation trajectory, and the like of exchange robot 40 and a target object detected by various sensors (not shown) during the execution of the predetermined work. Specifically, when the predetermined work is the exchange operation of feeder 20, the "execution process" includes a fact that feeder 20 has passed a predetermined position in the Y-direction, a passing time, and a required time for passing detected by a sensor provided at the front part of component mounter 10. The specified operation indicated by work information Df will be described together with various aspects of the specified operation described later.

Work information Df is a kind of trace information (operation history information) relating to at least one of the execution result and the execution process of the predetermined work as described above. As a result, when control section 44 performs the control such that the specified operation is included in the operation of exchange robot 40 that executes the predetermined work, the trace information indicates that there is a specified operation. On the other hand, if the worker executes the predetermined work, for example, the exchange time and the required time for exchanging feeder 20 are indicated, and the trace information relating to this indicates that there is no specified operation.

Identification section 52 identifies whether the work subject of the predetermined work is a worker or exchange robot 40 based on the work information Df acquired by information acquisition section 51. That is, identification section 52 determines that the work subject is a worker if the specified operation is not included in the operation of the work subject that executes the predetermined work based on work information Df. On the other hand, identification section 52 determines that the work subject is exchange robot 40 if the specified operation is included in the operation of the work subject that executes the predetermined work based on work information Df.

Here, in the identification of the work subject as described above, in order to further improve the identification accuracy, whether the work subject of the predetermined work is a worker or exchange robot 40 may be identified based on a detection result by detection device 60 that detects the worker in work area Rw in addition to work information Df. Detection device 60 described above is a device that detects only the worker when the worker and exchange robot 40 execute the predetermined work.

Specifically, detection device 60 may include human sensor 61 that detects a worker positioned when executing the predetermined work in work area Rw. Human sensor 61 detects the presence of workers in the vicinity and transmits a signal based on the detection. Human sensor 61 detects a worker using infrared rays, ultrasonic waves, or the like. Detection device 60 recognizes whether the worker is close enough to component mounter 10 to such an extent that the worker can execute the exchange operation in work area Rw based on, for example, the signal transmitted from human sensor 61.

In addition, as shown in FIG. 3, detection device 60 may include holding sensor 62 that is provided in first held section 23 of feeder 20, and detects the holding of feeder 20 by the worker. Holding sensor 62 is configured with a switching element, a piezoelectric element, or the like provided on the inner peripheral surface of first held section 23. Holding sensor 62 definitely becomes ON state when the worker grips first held section 23.

In the configuration in which the electric power is supplied only when feeder 20 is equipped to component mounter 10 and communication is possible, holding sensor 62 detects the state immediately after being equipped or immediately before being recovered, and transmits a signal based on the detection. Detection device 60 recognizes whether the worker in work area Rw executed the exchange operation, or the worker is going to execute the exchange operation based on, for example, the signal transmitted from holding sensor 62.

Work management system 50 includes information management section 53 in the present embodiment. Information management section 53 executes the management process of various management information according to a result of identification by identification section 52, that is, the work subject of the executed predetermined work. Here, the information associated with feeder 20 is included in management information Dm described above. Specifically, management information Dm is information in which the type of carrier tape (corresponding to the type of component to be stored) loaded in feeder 20 is associated with each identification code of feeder 20. The association described above is made by the verification process by the worker.

Here, information management section 53 generates or updates management information Dm based on the result of verification process, for example, when the carrier tape is loaded on feeder 20. In the verification process, the identification code of feeder 20 is acquired by reading, for example, a two-dimensional code and the like attached to feeder main body 21 of feeder 20 with a reader. Similarly, the identification code of the carrier tape is acquired by reading, for example, a two-dimensional code attached to the reel with a reader.

Information management section 53 manages management information Dm such that the wrong type of component is not supplied by component mounter 10 in the mounting process. However, for example, in a state in which feeder 20 is removed from component mounter 10 and the electric power is not supplied, the state of feeder 20 cannot be recognized. Therefore, it is uncertain whether the combination of feeder 20 and the carrier tape loaded thereon coincides with the combination indicated by management information Dm.

Therefore, when the state in which feeder 20 cannot be recognized is continued for a certain period of time, information management section 53 discards management information Dm corresponding to feeder 20. As a result, when feeder 20 is reequipped to component mounter 10, the worker executes the verification process again. As a result, information management section 53 generates management information Dm and prevents the wrong type of component from being supplied in the mounting process.

Here, when management information Dm is discarded regardless of the fact that feeder 20 recovered by exchange system 30 is held in exchange robot 40 and feeder storage device 5, the verification process needs to be executed when feeder 20 is automatically equipped to component mounter 10. Eventually, it requires the work by the worker, which may obstruct the automation and the labor saving. Therefore, information management section 53 maintains management information Dm corresponding to feeder 20 recovered from component mounter 10 without involving the worker rather than discarding it.

Therefore, in order to appropriately perform discarding and maintaining of management information Dm by information management section 53, it is necessary to accurately identify the work subject that executed the exchange operation of feeder 20. On the other hand, with the configuration described above, information management section 53 can manage management information Dm based on the result of identification (whether the work subject is the worker or exchange robot 40) by identification section 52. As a result, it is possible to prevent the productivity from being deteriorated by excessively executing the verification process, and it is possible to improve the accuracy of the mounting process.

Work management system 50 includes exchange command section 54. Exchange command section 54 commands exchange system 30 to perform the exchange operation of feeder 20 based on the production plan that defines the type and quantity of board products to be produced, the production order, and the like, and the current setup state of production line 1. In addition, in the present embodiment, exchange command section 54 collectively commands exchange robot 40 to execute the exchange operation of multiple feeders 20.

Here, in work management system 50, multiple component mounter 10, information acquisition section 51, identification section 52, information management section 53, exchange command section 54, and detection device 60 belong to the same first control system Lw1. On the other hand, exchange system 30 and exchange command section 54 belong to second control system Lw2, which is independent of first control system Lw1. Identification section 52 can communicate with exchange robot 40, but belongs to a control system different from control section 44 of exchange robot 40, and identifies the work subject of the predetermined work regardless of the communication with control section 44.

Work management system 50 includes storage device 55. Storage device 55 is configured with an optical drive device such as a hard disk device, a flash memory, or the like. Work information Df and management information Dm for each of multiple feeders 20 are stored in storage device 55. Work information Df and management information Dm are generated and updated by host computer 6.

7. Regarding Specified Operation and Work Information Df

When exchange robot 40 executes a predetermined work, the specified operation included in the operation of exchange robot 40 and work information Df indicating the presence or absence of the specified operation will be described. Here, an aspect in which the predetermined work is the exchange operation (replenishment work or recovery work) of feeder 20 which is an exchange element will be described as an example for the description. The specified operation is not necessarily limited to the operation that the worker cannot execute. In addition, the specified operation is not limited to the operation that exchange robot 40 is almost 100% successful.

That is, when both the worker and exchange robot 40 execute the predetermined work such that the specified operation is included, the specified operation is an operation in which a difference equal to or more than a certain amount occurs in the probability that the specified operation is actually included in the operation of each work subject. At this time, the specified operation is an operation in which the above-described probability when exchange robot 40 is the work subject is higher than the above-described probability when the worker is the work subject. Accordingly, it is desirable that the specified operation is an operation in which the above-described probability when exchange robot 40 is the work subject is close to 100%. In addition, it is desirable that the specified operation is an operation in which the above-described probability when the worker is the work subject is close to 0%.

Furthermore, when equal to or more than one exchange operations are executed, it is desirable that the specified operation is an operation in which the presence or absence of the specified operation can be easily determined from at least one of the execution result and the execution process. Since there is a correlation between the above-described probability and the identification accuracy of the work subject, the identification accuracy can be improved by setting the specified operation using the results. In addition, by appropriately setting the specified operation while ensuring the identification accuracy, it is possible to suppress the increase in the required time for executing the specified operation.

The specified operation in a first aspect is an operation of executing each of the exchange operations for three or more feeders 20 within a certain period of time during which the worker cannot execute the exchange operation. Specifically, when the worker attempts to execute the exchange operation of feeder 20, since first held section 23 of feeder 20 is gripped with one hand, it is difficult to grip two feeders 20 with both hands and execute the exchange operation but possible, however, it is extremely difficult to grip and execute the targets of equal to or more than three. A time shorter than the required time for the exchange operation for three feeders 20 by a worker who is skilled in exchange operation corresponds to a certain period of time during which the worker cannot execute the exchange operation.

On the other hand, in the present embodiment, exchange robot 40 is provided with three holding arms 41 to 43, and can attempt to execute each exchange operation for three feeders 20 simultaneously. In the present embodiment, control section 44 of exchange robot 40 executes three exchange operations for three feeders 20 within a certain period of time. In this first aspect, work information Df indicates the presence or absence of the specified operation based on whether the exchange operations are executed equal to or more than three times within a certain period of time.

For example, when exchange robot 40 recovers three feeders 20 from component mounter 10 simultaneously, component mounter 10 enters a state in which the electric power is stopped to be supplied to three feeders 20 and the communication is disabled. As a result, component mounter 10 recognizes that three feeders 20 equipped so far were recovered (exchange operation was executed), and notifies work management system 50 of the start time of the exchange operation executed for each feeder. Work management system 50 records information relating to the notified exchange operation in work information Df.

As a result, work information Df indicates the specified operation that the recovery works were executed equal to or more than three times within a certain period of time according to the start time of each recovery work for the three feeders 20 described above. Similarly, in the replenishment work of feeder 20, a fact that component mounter 10 started supplying the electric power to three feeders 20 within a certain period of time is recorded in work information Df. As a result, work information Df indicates the specified operation that the replenishment works were executed equal to or more than three times within a certain period of time.

If exchange robot 40 includes four holding arms, the specified operation in the first aspect may be the above-described operation using three holding arms among the four holding arms, or may be an operation of executing each of the exchange operations for four feeders 20 using four holding arms within a certain period of time. Similar aspects can be applied when exchange robot 40 includes equal to or more than five holding arms.

The specified operation in a second aspect is at least one of an operation of executing a predetermined work in a specified required time set in advance and an operation of executing a predetermined work to be consecutively executed at a specified interval set in advance. Specifically, when the worker attempts to execute the exchange operation of feeder 20, even if the worker is skilled in the exchange operation, the variation occurs in the required time. In addition, when the worker attempts to execute the exchange operation continuously, the variation occurs in interval. It is very difficult to keep these variations below a certain level.

On the other hand, exchange robot 40 can count the required time for the exchange operation, for example, and can adjust the required time by inserting an appropriate waiting time such that the difference between the start time and the end time becomes constant. Furthermore, similarly to the consecutive exchange operations, exchange robot 40 can adjust the interval by appropriately inserting a waiting time such that the difference between the end time of the previous exchange operation and the start time of the after exchange operation becomes constant. In this second aspect, work information Df indicates the presence or absence of the specified operation based on whether the exchange operation is executed within the required time or whether the exchange operation is executed at the intervals of consecutive predetermined works.

By adopting the specified operation in the first aspect or the specified operation in the second aspect exemplified in the description above, the difference between the probabilities can be increased. Control section 44 may appropriately switch the specified operation in the first aspect and the specified operation in the second aspect, or may be adopt both simultaneously. In addition, specified operations other than the above-described may be applied. As a result, the identification accuracy of the work subject can be improved by applying the specified operations in various aspects.

8. Work Subject Identification Process

Figure 6:
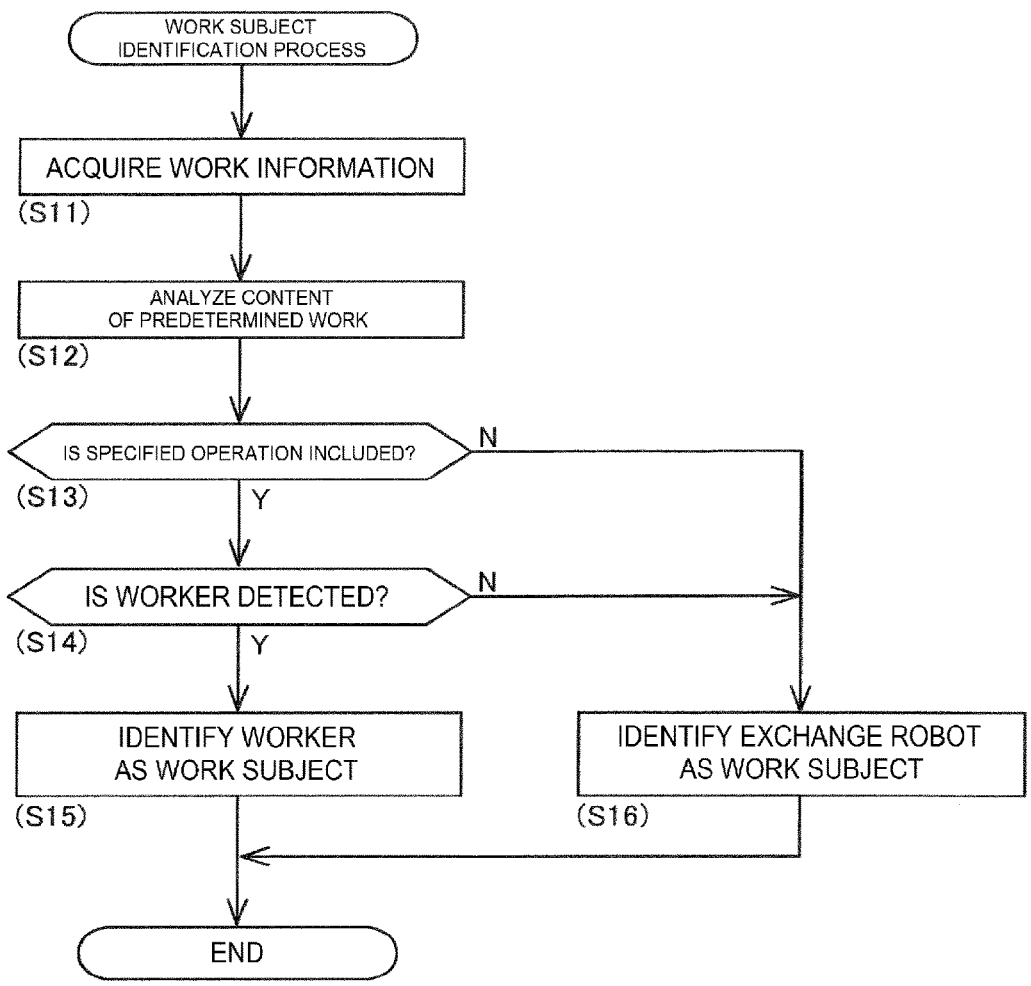
FIG. 6 is a flowchart showing a work subject identification process.

A work subject identification process by work management system 50 will be described with reference to FIG. 5 and FIG. 6. For example, if the predetermined work is the exchange operation of feeder 20, the work subject identification process is executed with a triggering that component mounter 10 notifies of a fact that equal to or more than one exchange operations have been executed and that the work information Df has been updated.

First, information acquisition section 51 acquires updated work information Df from storage device 55 (S11). Identification section 52 analyzes the content of the predetermined work (at least one of the execution result and the execution process) using work information Df acquired by information acquisition section 51 (S12). Then, identification section 52 determines whether the specified operation in the aspects set in advance is included in the operation of the work subject executing the predetermined work (S13).

When the specified operation is not included in the operation of the work subject (NO in S13), identification section 52 recognizes that there is a high possibility that the predetermined work has been executed by the worker. In the present embodiment, identification section 52 further determines whether the worker is detected by detection device 60 during the period when the predetermined work is executed (S14). Here, when the worker is detected by detection device 60 (YES in S14), identification section 52 identifies that the work subject of the predetermined work is the worker (S15).

On the other hand, when the specified operation is included in the operation of the work subject (YES in S13), identification section 52 identifies that the work subject of the predetermined work is exchange robot 40 (S16). In addition, there is a case where the specified operation is not included in the operation of the work subject (NO in S13), and the worker is not detected by detection device 60 (S14: No). In such a case, identification section 52 assumes that exchange robot 40 failed to include the specified operation in the predetermined work, and identifies that the work subject of the predetermined work is exchange robot 40 (S16).

In the state described above (NO in S13 and NO in S14), identification section 52 may execute error handling such as notifying the worker that the work subject is unknown. Identification section 52 stores a result of the work subject identification process in storage device 55 in association with the executed predetermined work. The result of identification process described above is used, for example, for managing the exchange element by information management section 53.

According to the configuration described above, when a predetermined work is executed in work area Rw, it is possible to identify the work subject based on whether the specified operation is included in the predetermined work, or based on the detection result of whether the worker is detected in work area Rw during the execution of the predetermined work (S13 to S16). As a result, the work subject can be identified regardless of the presence or absence of the communication between exchange robot 40 and work management system 50, it is possible to suppress the increase in the process load and the required time, and thus, it is possible to improve the work manageability.

In addition, in the present embodiment, identification section 52 belongs to first control system Lw1 which is independent of control section 44, and identifies the work subject of the predetermined work without the communication with control section 44 (S15 and S16). With such a configuration, the control systems are independent of each other, and it is possible to proceed with the predetermined work commanded to oneself without waiting for the establishment of communication with the other party. As a result, it is possible to improve the work efficiency in work area Rw. In addition, since the work manageability can be improved in such an environment, it is possible to improve the productivity and the work efficiency.

9. Modified Aspect of Embodiment 9-1. Regarding Work Subject Identification Process In the embodiment, work management system 50 identifies the work subject in the work subject identification process (S15 and S16) based on whether the operation of the work subject includes the specified operation (S13) and based on whether the worker is detected by detection device 60 (S14). On the other hand, work management system 50 may identify the work subject by any one of determinations. That is, work management system 50 may omit the determination (S14) based on the detection result by detection device 60 and may identify the work subject based on the presence or absence of the specified operation.

Figure 7:
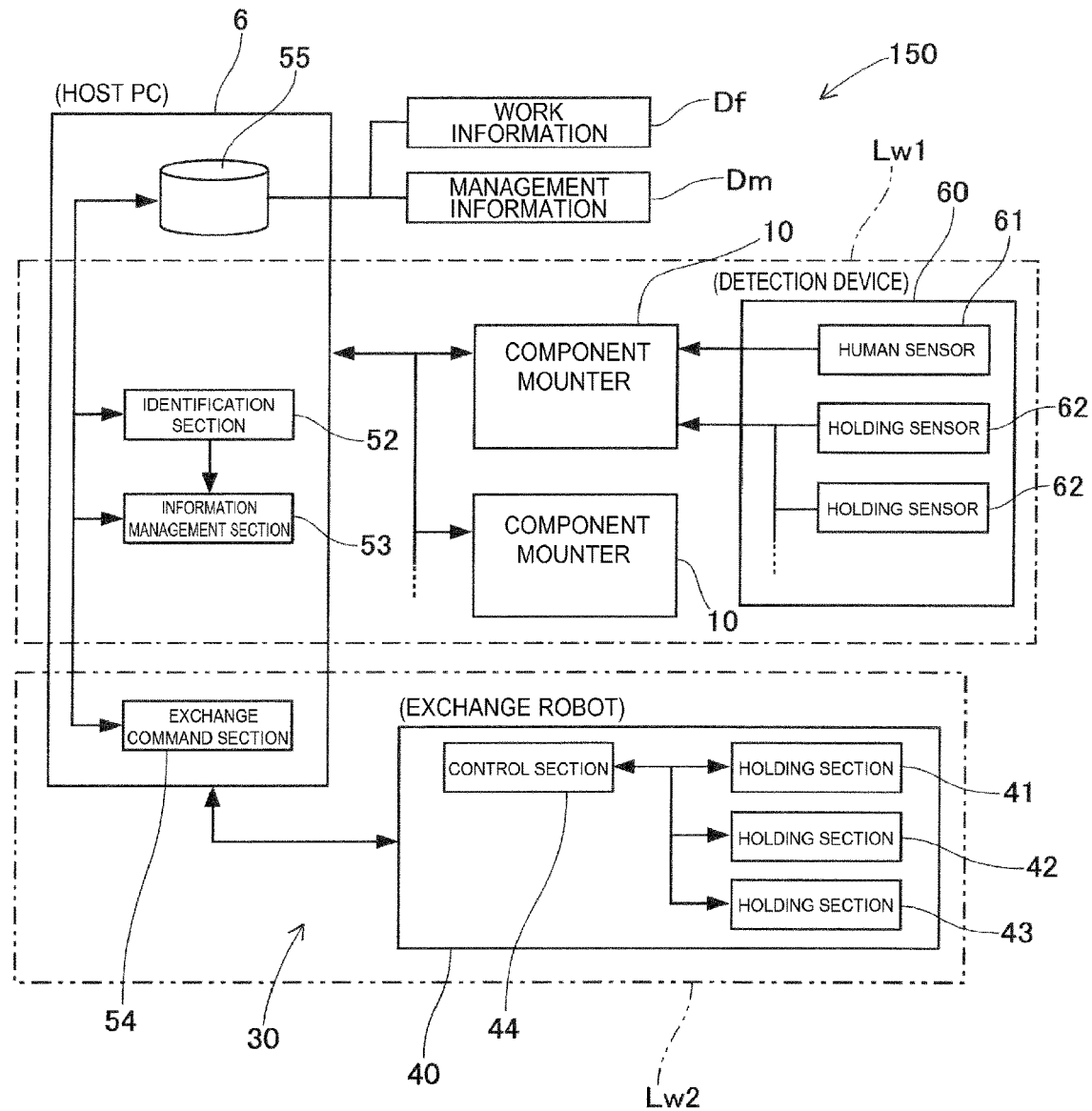
FIG. 7 is a block diagram showing the work management system in a modified aspect.

In addition, work management system 50 may omit the acquisition of work information Df (S11) by information acquisition section 51, the analysis of the content of the predetermined work (S12), and the determination of the presence or absence of the specified operation (S13), and may identify the work subject based on the detection result by detection device 60. Specifically, as shown in FIG. 7, work management system 150 mainly includes identification section 52 and detection device 60. As described above, even in a configuration in which work management system 150 does not include information acquisition section 51, the work subject identification process can be executed.

9-2. Regarding Predetermined Work by Work Subject

In the embodiment, the exchange element targeted to be exchanged by exchange system 30 and exchange robot 40 is feeder 20 that is equipped to component mounter 10 and supplies the component mounted on board 90. Items other than feeder 20 may be the exchange element targeted to be exchanged by exchange system 30 and exchange robot 40. Specifically, for example, a tape reel, a nozzle station, a waste tape recovery container, and the like, which are equipped to component mounter 10 so as to be exchangeable, can be the exchange elements.

There is a type of feeder in which a reel holder for holding the tape reel is disposed externally. Therefore, exchange robot 40 can accurately deliver the tape reels by automatically exchanging the tape reels of the feeder. In addition, the nozzle station needs to hold the suction nozzles corresponding to the types of components used in the production of board products. Therefore, the production efficiency in production line 1 can be improved by disposing a storage device for the nozzle station in production line 1 and enabling the nozzle station to be automatically exchanged between the storing device and component mounter 10.

In addition, the waste tape recovery container described above is, for example, a container that is equipped below upper slot 121 of component mounter 10 and recovers the waste tape generated when each feeder 20 supplies the components. This waste tape is, for example, a portion of a carrier tape from which the components are taken out is cut to an appropriate length. The capacity of the waste tape recovery container is limited. Therefore, from a viewpoint of maintaining a good production state, it is useful to maintain an amount of recovered waste tapes by the waste tape recovery container equal to or less than a certain amount using exchange robot 40, for example.

Alternatively, if feeder 20 is a stick feeder, exchange robot 40 may be configured to supply sticks and recovers the empty sticks. In addition, if feeder 20 is a bulk feeder, exchange robot 40 may be configured to supply bulk components, supply a component case accommodating the bulk components, and recover the empty component case. In such a configuration also, the exchange element can be automatically replenished and recovered, and thus, the production efficiency in production line 1 can be improved.

In addition, in the embodiment, the robot that executes the predetermined work together with the worker in work area Rw is exchange robot 40. On the other hand, the robot that is targeted to be managed by work management system 50 may be a convey robot that conveys feeder 20 between, for example, feeder storage device 5 in production line 1 and a storage warehouse (not shown) in which feeder 20 is stored.

In the configuration described above, work management system 50 may identify the work subject by setting a work in which the convey robot exchanges feeders 20 individually or, for example, collectively for feeders 20 required for a predetermined production between feeder storage device 5, as a predetermined work. In such a configuration, the same effect as that of the embodiment is obtained.

In addition to the exchange operation of the exchange element, the predetermined work may be, for example, a supply work of a predetermined article, a recovery work, an inspection work of a board work machine, or a calibration work as long as a predetermined work is executed in work area Rw by a worker and a robot. In such a configuration, work management system 50 can identify the work subject based on at least one of the presence or absence of the specified operation and the detection result by detection device 60.

REFERENCE SIGNS LIST

1: production line, 5: feeder storage device, 6: host computer, 10: component mounter (work device), 20: feeder (exchange element), 21: feeder main body, 22: driving device, 23: first held section, 24: second held section, 30: exchange system, 40: exchange robot, 41 to 43: holding arm, 44: control section, 50: work management system, 51: information acquisition section, 52: identification section, 53: information management section, 54: exchange command section, 55: storage device, 60: detection device, 61: human sensor, 62: holding sensor, Rw: work area, Lw1: first control system, Lw2: second control system, Df: work information, Dm: management information

The invention claimed is:

1. A work management system that is applied to a work area in which a predetermined work is executed by a worker and a robot, comprising:
a controller configured to control the robot such that a specified operation set in advance is included in an operation by the robot executing the predetermined work which a replenishment work or a recovery work of the feeder for a work device including the feeder; and a computer configured to
acquire work information indicating a presence or absence of the specified operation in at least one of an execution result and an execution process of the predetermined work when the predetermined work is executed in the work area; and
identify whether a work subject of the predetermined work is the worker or the robot based on the acquired work information,
wherein the robot is configured to perform an exchange process of a feeder, the robot including a first portion aligned with an upper slot of the work device, a second portion aligned with a lower slot of the work device disposed below the first portion, and holding arms each being independently movable in an attachment and detachment direction and each including a distal end portion configured to cooperate with a held section of the feeder so as to hold the feeder, the holding arms being integrally movable in an up-down direction between the first portion and the second portion, and the controller is configured to control the holding arms.

2. The work management system according to claim 1, wherein, when both the worker and the robot execute the predetermined work such that the specified operation is included, the specified operation is an operation in which a probability that the robot performed the specified operation is greater than a predetermined value.

3. The work management system according to claim 1, wherein the specified operation is an operation of executing each of the predetermined works for three or more feeders within a certain period of time during which the worker cannot execute the predetermined work.

4. The work management system according to claim 3, wherein the work information indicates the presence or absence of the specified operation based on whether the predetermined work is executed three or more times within the certain period of time.

5. The work management system according to claim 1, wherein the specified operation is at least one of an operation of executing the predetermined work within a specified required time set in advance and an operation of executing the predetermined work consecutively executed at a specified interval set in advance.

6. The work management system according to claim 5, wherein the work information indicates the presence or absence of the specified operation based on whether the predetermined work is executed within the required time or whether the predetermined work is executed at the interval of the consecutive predetermined works.

7. The work management system according to claim 1, further comprising:
a detection device configured to detect the worker in the work area,
wherein the computer is configured to identify whether the work subject of the predetermined work is the worker or the robot based on a detection result by the detection device when the predetermined work is executed in the work area.

8. A work management system that is applied to a work area in which a predetermined work is executed by a worker and a robot, comprising:
a controller configured to control the robot executing the predetermined work;
a detection device configured to detect the worker in the work area; and
a computer configured to identify whether a work subject of the predetermined work is the worker or the robot based on a detection result by the detection device when the predetermined work is executed in the work area,
wherein the robot is configured to perform an exchange process of a feeder, the robot including a first portion, a second portion disposed below the first opening, and holding arms each being independently movable in an attachment and detachment direction and each including a distal end portion configured to cooperate with a held section of the feeder so as to hold the feeder, the holding arms being integrally movable in an up-down direction between the first portion and the second portion, and the controller is configured to control the holding arms,
wherein the predetermined work is a replenishment work or a recovery work of the feeder for a work device including the feeder, and
wherein the first portion of the robot is aligned with an upper slot of the work device, and the second portion of the robot aligned with a lower slot of the work device.

9. The work management system according to claim 7, wherein the detection device includes a human sensor that detects the worker positioned in the work area.

10. The work management system according to claim 7, wherein
the feeder includes another held section that is held when the worker executes the predetermined work that is different from the held section, and
the detection device includes a holding sensor that is provided on the another held section and detects holding of the feeder by the worker.

11. The work management system according to claim 1, wherein the computer is configured to manage management information associated with the feeder based on a result of the identifying performed by the computer.

12. The work management system according to claim 1, wherein the computer is independent of the controller, and identifies the work subject of the predetermined work regardless of communication with the controller.

* * * * *